(12) United States Patent
Fujinaga et al.

(10) Patent No.: US 8,974,698 B2
(45) Date of Patent: Mar. 10, 2015

(54) PRODUCTION METHOD OF SIALON-BASED OXYNITRIDE PHOSPHOR, AND SIALON-BASED OXYNITRIDE PHOSPHOR

(75) Inventors: Masataka Fujinaga, Ube (JP); Takayuki Ueda, Ube (JP); Shinsuke Jida, Ube (JP)

(73) Assignee: Ube Industries, Ltd. (JP)

( * ) Notice: Subject to any disclaimer, the term of this patent is extended or adjusted under 35 U.S.C. 154(b) by 76 days.

(21) Appl. No.: 13/637,109

(22) PCT Filed: Mar. 30, 2011

(86) PCT No.: PCT/JP2011/058664
§ 371 (c)(1),
(2), (4) Date: Sep. 25, 2012

(87) PCT Pub. No.: WO2011/126035
PCT Pub. Date: Oct. 13, 2011

(65) Prior Publication Data
US 2013/0020533 A1 Jan. 24, 2013

(30) Foreign Application Priority Data
Mar. 31, 2010 (JP) ................................. 2010-082067

(51) Int. Cl.
C09K 11/08 (2006.01)
C09K 11/64 (2006.01)
C09K 11/77 (2006.01)
H01L 33/50 (2010.01)

(52) U.S. Cl.
CPC ......... *C09K 11/7734* (2013.01); *C09K 11/0883* (2013.01)
USPC .................................................. 252/301.4 F

(58) Field of Classification Search
USPC .................................................. 252/301.4 F
See application file for complete search history.

(56) References Cited

U.S. PATENT DOCUMENTS

| | | | |
|---|---|---|---|
| 2003/0030038 A1 | 2/2003 | Mitomo et al. | |
| 2004/0155225 A1* | 8/2004 | Yamada et al. | 252/301.4 R |
| 2005/0194604 A1 | 9/2005 | Sakuma et al. | |
| 2005/0285506 A1 | 12/2005 | Sakuma et al. | |
| 2006/0043337 A1 | 3/2006 | Sakane et al. | |
| 2006/0061263 A1 | 3/2006 | Sakuma et al. | |
| 2006/0208260 A1 | 9/2006 | Sakuma et al. | |
| 2007/0164308 A1 | 7/2007 | Yoshimura et al. | |
| 2007/0246732 A1 | 10/2007 | Sakuma et al. | |
| 2007/0248519 A1 | 10/2007 | Mitomo et al. | |
| 2007/0278510 A1 | 12/2007 | Sakuma et al. | |
| 2008/0064586 A1 | 3/2008 | Mitomo et al. | |
| 2009/0021141 A1 | 1/2009 | Emoto et al. | |
| 2009/0085465 A1 | 4/2009 | Hirosaki et al. | |
| 2009/0091237 A1 | 4/2009 | Hirosaki et al. | |
| 2010/0072881 A1 | 3/2010 | Sakuma et al. | |
| 2010/0208481 A1 | 8/2010 | Miyake et al. | |
| 2010/0237767 A1 | 9/2010 | Emoto et al. | |
| 2011/0279018 A1 | 11/2011 | Emoto et al. | |

FOREIGN PATENT DOCUMENTS

| | | |
|---|---|---|
| EP | 1 854 864 | 11/2007 |
| EP | 2 022 835 | 2/2009 |
| EP | 2 415 708 A1 | 2/2012 |
| JP | 58-55316 A | 4/1983 |
| JP | 9-221308 A | 8/1997 |
| JP | 2003-336059 A | 11/2003 |
| JP | 2004-186278 A1 | 7/2004 |
| JP | 2004-238505 A | 8/2004 |
| JP | 2004-238505 A | 8/2004 |
| JP | 2005-36038 A | 2/2005 |
| JP | 2005-162808 A | 6/2005 |
| JP | 2005-286312 A | 10/2005 |
| JP | 2006-045271 A | 2/2006 |
| JP | 2006-057018 A | 3/2006 |
| JP | 2006-257353 A | 9/2006 |
| JP | 2007-332324 A | 12/2007 |
| JP | 2008-231300 A | 10/2008 |
| JP | 2009-096883 A | 5/2009 |
| JP | 2010-116564 A | 5/2010 |
| JP | 2010-235339 A | 10/2010 |
| JP | 2010-235341 A | 10/2010 |
| WO | 2005/090514 A1 | 9/2005 |
| WO | 2005/090517 A | 9/2005 |
| WO | 2005/123876 A1 | 12/2005 |
| WO | 2006/006582 A1 | 1/2006 |
| WO | 2006/025261 A1 | 3/2006 |
| WO | 2007/004492 A1 | 1/2007 |
| WO | 2007/004493 A1 | 1/2007 |
| WO | 2008/004640 A1 | 1/2008 |
| WO | 2009/051138 A1 | 4/2009 |
| WO | 2010/018873 A1 | 2/2010 |
| WO | 2010/087348 A1 | 8/2010 |

OTHER PUBLICATIONS

Extended European Search Report from corresponding EP11765935.9 dated Apr. 3, 2014.

* cited by examiner

*Primary Examiner* — Carol M Koslow
(74) *Attorney, Agent, or Firm* — DLA Piper LLP (US)

(57) ABSTRACT

A method for producing an α-sialon-based oxynitride phosphor includes a mixed powder blended such that the product is represented by the formula: $M_xSi_{12-(m+n)}Al_{(m+n)}O_nN_{16-n}$:$Ln_y$ (wherein M is at least one metal selected from Li, Ca, Mg, Y and a lanthanide metal excluding La and Ce, Ln is at least one lanthanide metal selected from Eu, Dy, Er, Tb and Yb), the mixed powder containing an amorphous silicon nitride powder having an loose bulk density of 0.16 to 0.22 g/cm$^3$, and is fired at 1,400 to 2,000° C. in a nitrogen-containing inert gas atmosphere.

7 Claims, No Drawings

PRODUCTION METHOD OF SIALON-BASED OXYNITRIDE PHOSPHOR, AND SIALON-BASED OXYNITRIDE PHOSPHOR

TECHNICAL FIELD

The present invention relates to a production method of an α-sialon-based oxynitride phosphor, and a sialon-based oxynitride phosphor. More specifically, the present invention relates to a production method of an α-sialon-based oxynitride phosphor activated with a rare earth metal element in a powder state, and a sialon-based oxynitride phosphor, which can realize high brightness of a white light-emitting diode (white LED) using a blue light-emitting diode (blue LED) as the light source.

BACKGROUND ART

Phosphors using a silicate, a phosphate (for example, apatite) or an aluminate as the host material, where a transition metal or a rare earth metal is added as an activating material to the host material, are widely known. In particular, with recent practical realization of a blue LED, development of a white light source utilizing the blue LED is being aggressively pursued. A white LED is expected to have a lower power consumption and a longer service life than existing white light sources and therefore, development as a backlight for liquid crystal panels, an indoor lighting device, a backlight for automobile panels, and the like is proceeding.

The currently developed white LED is obtained by coating a YAG (yttrium.aluminum.garnet)-based phosphor on the surface of a blue LED, where a Ce-activated YAG-based phosphor converts blue light of the blue LED into yellow light. A part of blue light at a wavelength of 450 nm emitted from the blue LED penetrates the phosphor layer, and the remainder strikes the phosphor and is converted into yellow light. These two light colors of blue and yellow are mixed to make the light look white.

However, the YAG-based phosphor has a problem that not only the white light is blue-tinted due to reduction in the spectral intensity when the excitation wavelength exceeds 400 nm, but also the luminous efficiency is low because the excitation energy of the blue LED does not agree with the excitation energy of the YAG-based phosphor. There is also a problem that durability of the coated phosphor layer is insufficient. Accordingly, improvements are demanded on the performance of the phosphor itself used for wavelength conversion.

In Patent Document 1, the applicant of the present invention has disclosed an α-sialon-based oxynitride phosphor represented by the formula: $M_xSi_{12-(m+n)}Al_{(m+n)}O_nN_{16-n}:Ln_y$ (wherein $0.3 \le x+y<1.5$, $0<y<0.7$, $0.3 \le m<4.5$, $0<n<2.25$, and assuming that the valence of the metal M is a and the valence of the lanthanide metal Ln is b, $m=ax+by$), wherein a part or all of the metal M (M is at least one metal selected from Li, Ca, Mg, Y and a lanthanide metal excluding La and Ce) solid-dissolved in α-sialon is replaced by the lanthanide metal Ln (Ln is at least one lanthanide metal selected from Eu, Dy, Er, Tb and Yb) for the luminescence center.

The α-sialon-based oxynitride phosphor disclosed in Patent Document 1 is certainly an excellent phosphor, but improving the luminescence intensity of the phosphor is in demand.

RELATED ART

Patent Document (Patent Document 1) Japanese Unexamined Patent Publication (Kokai) No. 2004-238505

SUMMARY OF THE INVENTION

Problems to be Solved by the Invention

An object of the present invention is to provide a production method of an oxynitride phosphor mainly composed of an α-sialon, represented by the formula: $M_xSi_{12-(m+n)}Al_{(m+n)}O_nN_{16-n}:Ln_y$ (wherein $0.3 \le x+y<1.5$, $0<y<0.7$, $0.3 \le m<4.5$, $0<n<2.25$, and assuming that the valence of the metal M is a and the valence of the lanthanide metal Ln is b, $m=ax+by$), which is a photoluminescent phosphor capable of realizing high brightness of a white LED using a blue LED as the light source.

Means to Solve the Problems

The applicant of the present invention has found that in the production of an oxynitride phosphor, when an amorphous silicon nitride powder with a high loose bulk density is used as a raw material, a photoluminescent phosphor capable of realizing a highly bright white LED using a blue LED as the light source can be obtained. The present invention has been accomplished based on this finding.

That is, the present invention relates to a method for producing an α-sialon-based oxynitride phosphor in a powder state, wherein a mixed powder containing an amorphous silicon nitride powder having an loose bulk density of 0.1 to 0.3 g/cm³, in which typically an AlN and/or Al powder, an oxide of a metal M or a precursor substance capable of becoming an oxide of the metal by pyrolysis, and an oxide of a lanthanide metal Ln or a precursor substance capable of becoming an oxide of the lanthanide metal by pyrolysis are combined in a blending ratio calculated on the assumption that the product is represented by the formula:

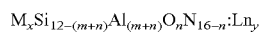

(wherein M is at least one metal selected from Li, Ca, Mg, Y and a lanthanide metal excluding La and Ce, Ln is at least one lanthanide metal selected from Eu, Dy, Er, Tb and Yb, $0.3 \le x+y<1.5$, $0<y<0.7$, $0.3 \le m<4.5$, and $0<n<2.25$), is fired at 1,400 to 2,000° C. in a nitrogen-containing inert gas atmosphere.

The present invention also relates to the method for producing an α-sialon-based oxynitride phosphor in a powder state, wherein the specific surface area of the amorphous silicon nitride powder is from more than 600 m²/g to 800 m²/g.

Effects of the Invention

The oxynitride phosphor mainly composed of an α-sialon of the present invention exhibits a high emission intensity and a spectrum of appropriate wavelengths and therefore, can be used as a highly-bright, highly-reliable white LED using a blue LED as the light source.

MODE FOR CARRYING OUT THE INVENTION

The production method of an α-sialon-based oxynitride phosphor in a powder state of the present invention is a method for producing an α-sialon-based oxynitride phosphor in a powder state, wherein a mixed powder containing an amorphous silicon nitride powder having an loose bulk density of 0.1 to 0.3 g/cm$^3$, in which typically an AlN and/or Al powder, an oxide of a metal M or a precursor substance capable of becoming an oxide of the metal by pyrolysis, and an oxide of a lanthanide metal Ln or a precursor substance capable of becoming an oxide of the lanthanide metal by pyrolysis are combined in a blending ratio calculated on the assumption that the product is represented by the formula: $M_xSi_{12-(m+n)}Al_{(m+n)}O_nN_{16-n}$:$Ln_y$ (wherein M is at least one metal selected from Li, Ca, Mg, Y and a lanthanide metal excluding La and Ce, Ln is at least one lanthanide metal selected from Eu, Dy, Er, Tb and Yb, $0.3 \leq x+y < 1.5$, $0 < y < 0.7$, $0.3 \leq m < 4.5$, and $0 < n < 2.25$), is fired at 1,400 to 2,000° C. in a nitrogen-containing inert gas atmosphere.

In the following formula representing an α-sialon-based oxynitride phosphor produced by the production method of the present invention:

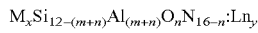

$$M_xSi_{12-(m+n)}Al_{(m+n)}O_nN_{16-n}:Ln_y$$

the metal M interstitially solid-dissolved in the α-sialon and the lanthanide metal Ln working out to the luminescence center dissolve as a solid solution to a maximum of two per large unit cell of α-sialon including the four formula weight of $(Si,Al)_3(N,O)_4$ and therefore, in view of solid solubility limit, subindices in the formula satisfy $0.3 \leq x+y < 1.5$, $0 < y < 0.7$, $0.3 \leq m < 4.5$, $0 < n < 2.25$, and assuming that the valence of the metal M is a and the valence of the lanthanide metal Ln is b, $m = ax + by$. For example, when both the interstitial metal M and Ln are divalent, $0.6 \leq m < 3.0$ and $0 < n < 1.5$, and when both the interstitial metal M and Ln are trivalent, $0.9 \leq m < 4.5$ and $0 < n < 2.25$.

An α-sialon-based oxynitride phosphor is produced by using a starting material containing an amorphous silicon nitride powder having an loose bulk density of 0.1 to 0.3 g/cm$^3$, whereby a photoluminescent phosphor capable of a realizing high brightness of a white LED using a blue LED as the light source can be obtained. The loose bulk density of the amorphous silicon nitride powder is from 0.1 to 0.3 g/cm$^3$, preferably from 0.16 to 0.22 g/cm$^3$. If the loose bulk density is less than 0.1 g/cm$^3$, the effect of enhancing the fluorescence intensity is not obtained, whereas if the loose bulk density exceeds 0.3 g/cm$^3$, this causes reduction in the fluorescence characteristics.

The loose bulk density or untamped density of the powder is measured in accordance with JIS R9301-2-3 and specifically, is a value measured by slowly dropping a sample in a measurement vessel through a chute and calculated from the weight and volume thereof.

Also, the specific surface area of the amorphous silicon nitride powder is from more than 600 m$^2$/g to 800 m$^2$/g, preferably from 650 to 800 m$^2$/g. If the specific surface area is 600 m$^2$/g or less, crystallinity of the α-sialon is reduced and the fluorescence characteristics are not enhanced, whereas if the specific surface area exceeds 800 m$^2$/g, a crystal phase other than α-sialon is produced and the fluorescence characteristics are impaired.

Although not limited to this method, the amorphous silicon nitride powder having an loose bulk density of 0.16 to 0.22 g/cm$^3$ for use in the present invention can be produced by heat-treating a nitrogen-containing silane compound powder having an loose bulk density of 0.10 to 0.30 g/cm$^3$. Also, the nitrogen-containing silane compound powder having an loose bulk density of 0.10 to 0.30 g/cm$^3$ can be obtained by the production method disclosed in Japanese Unexamined Patent Publication (Kokai) Nos. 2010-225339 and 2010-235341 filed by the applicant of the present invention. The production method is described below.

The nitrogen-containing silane compound powder having an loose bulk density of 0.10 to 0.30 g/cm$^3$ can be produced by a production method comprising mixing and reacting a halogenated silane compound with a liquid ammonia while supplying the halogenated silane compound by discharging it, as a solvent-free solution or an inert organic solvent solution having a halogenated silane compound concentration of 50 vol % or more, into the liquid ammonia from a supply port.

As the halogenated silane for use in the production method of the nitrogen-containing compound powder, a fluorinated silane such as $SiF_4$, $H_2SiF_6$, $HSiF_3$, $H_3SiF_5H_3SiF$ and $H_5SiF_3$, a chlorinated silane such as $SiCl_4$, $HSiCl_3$, $H_2SiCl_2$ and $H_3SiCl$, a brominated silane such as $SiBr_4$, $HSiBr_3$, $H_2SiBr_2$ and $H_3SiBr$, and an iodinated silane such as $SiI_4$, $HSiI_3$, $H_2SiI_2$ and $H_3SiI$ can be used. Also, a halogenated silane such as $RSiX_3$, $R_2SiX_2$ and $R_3SiX$ (R is an alkyl or alkoxy group, and X is a halogen) may be used.

In practicing this production method for the nitrogen-containing silane compound, the halogenated silane can be supplied as a solvent-free solution or a solution after dilution with a small amount of an organic solvent. In the case of supplying the halogenated silane as a solvent-free solution, the filtrate obtained by separating the produced nitrogen-containing silane compound powder by filtration from the reaction slurry consists of only two components, i.e., a liquid ammonia and a halogenated ammonium dissolved therein.

The organic solvent used for diluting the halogenated silane may be appropriately selected from those capable of dissolving the halogenated silane and incapable of reacting with the halogenated silane or liquid ammonia. Examples thereof include a chain aliphatic hydrocarbon having a carbon number of 5 to 12, such as n-pentane, n-hexane, n-heptane and n-octane, a cyclic aliphatic hydrocarbon such as cyclohexane and cyclooctane, and an aromatic hydrocarbon such as toluene and xylene.

The halogenated silane concentration in the mixed solution of an organic solvent and a halogenated silane is preferably 50 vol % or more, more preferably 66 vol % or more. If the concentration is less than 50 vol %, the produced nitrogen-containing silane compound powder cannot be sufficiently increased in the loose bulk density.

In practicing the production method of the nitrogen-containing silane compound, a discharge port for supplying the halogenated silane as a solvent-free solution or a solution after dilution with a small amount of an organic solvent is disposed in the liquid ammonia in a reaction vessel. At this time, the discharge linear velocity from the supply port is preferably kept at 5 cm/sec or more. If the linear velocity is not sufficiently high, a slight amount of ammonia is liable to diffuse and intrude into the inside of the supply piping from the discharge port. As a result, clogging of the supply piping due to production or by-production of a nitrogen silane compound or precipitation of a halogenated ammonium readily occurs in the vicinity of the discharge port and this is not practical. The discharge linear velocity from the supply port is more preferably kept at 8 cm/sec or more.

In practicing the production of the nitrogen-containing silane compound, the discharge pressure of a supply pump when supplying the halogenated silane as a solvent-free solution or a solution after dilution with a small amount of an organic solvent is preferably set to create a sufficiently large pressure difference. For example, the pump preferably has a device capacity capable of creating a pressure difference of 5.9 MPa or more, more preferably 7.8 MPa or more, from the pressure of the reaction vessel.

In practicing the production of the nitrogen-containing silane compound, the mixing ratio between the halogenated silane and the liquid ammonia in the reaction vessel is preferably volume of halogenated silane/volume of liquid ammonia=from 0.01 to 0.1. The mode for performing the reaction is not particularly limited and may be a batch system or a continuous system. The mixing ratio above indicates, in the case of performing the reaction in a batch system, the ratio between the total amount of halogenated silane and the total amount of liquid ammonia supplied to the reaction vessel per 1 batch, and in the case of a continuous system, indicates the ratio between the volume flow rate of halogenated silane and the volume flow rate of liquid ammonia in a stationary operation state.

The reaction temperature when practicing the production of the nitrogen-containing silane compound is not particularly limited and may be selected in a range from low temperature to ordinary temperature according to the equipment specification, but if the reaction temperature is high, the vapor pressure of liquid ammonia rises and the pressure specification of the reaction vessel needs to be made high. On the other hand, if the reaction temperature is too low, an excessive load is imposed on the cooling system. The appropriate reaction temperature is from −10 to 40° C., preferably from 0 to 30° C.

The pressure when practicing the production of the nitrogen-containing silane compound is substantially defined by the vapor pressure of liquid ammonia occupying a great part of the reaction slurry. The vapor pressure of liquid ammonia in the reaction slurry depends on the reaction temperature and therefore, the pressure at which the reaction is performed takes a value corresponding to the reaction temperature. The pressure is preferably from 0.3 to 1.6 MPa, more preferably from 0.4 to 1.6 MPa (absolute pressure). Under the pressure conditions set in this way, the liquid ammonia is present at a temperature near the boiling point and the large reaction heat generated at the synthesis of the nitrogen-containing silane compound can be absorbed due to evaporation of the ammonia existing in the neighborhood.

The nitrogen-containing silane compound is a compound generally also called silicon diimide and is an Si—N—H-based compound capable of existing in a form represented by various compositional formulae such as $Si_6N_{13}H_{15}$, $Si_6N_{12}H_{12}$ and $Si_6N_{11}H_9$ by readily absorbing or releasing $NH_3$ even at near room temperature. This nitrogen-containing silane compound or silicon diimide is represented by formula $Si(NH)_2$ in many cases but considering it as a compound having an imino or amino group bonded to silicon, is sometimes represented by chemical formula $Si(NH_x)_y$ (wherein x is 1 or 2, and y is 2 to 4).

The nitrogen-containing silane compound is, as described above, characterized by having an loose bulk density after production of 0.10 to 0.30 g/cm³, preferably from 0.16 to 0.22 g/cm³, but in addition, although not limited to these ranges, generally, the true density may be from 1.4 to 1.9 g/cm³, preferably from 1.5 to 1.7 g/cm³, and the specific surface area of the nitrogen-containing silane compound may be from 700 to 1,100 m²/g, preferably from 800 to 1,000 m²/g.

The nitrogen-containing silane compound having an loose bulk density of 0.10 to 0.30 g/cm³ is heat-treated, whereby an amorphous silicon nitride having an loose bulk density of 0.10 to 0.30 g/cm³ can be obtained. The heat treatment for obtaining the amorphous silicon nitride having an loose bulk density of 0.10 to 0.30 g/cm³ from the nitrogen-containing silane compound having an loose bulk density of 0.10 to 0.30 g/cm³ can be performed, for example, by firing at 600 to 1,200° C. in an inert gas or nitrogen atmosphere.

In the production method of an α-sialon-based oxynitride phosphor in a powder state of the present invention, for the aluminum source used as a raw material together with the above-described amorphous silicon nitride, an AlN and/or Al powder is used, and each of a metallic aluminum powder and an aluminum nitride powder may be used alone or these may be used in combination. As for the aluminum nitride powder, a general powder having an oxygen content of 0.1 to 8 mass % and a specific surface area of 1 to 100 m²/g can be used.

In the production method of an α-sialon-based oxynitride phosphor in a powder state of the present invention, in addition, an oxide of a metal M or a precursor substance capable of producing an oxide of the metal M by pyrolysis, and an oxide of a lanthanide metal Ln or a precursor substance capable of producing an oxide of the lanthanide metal Ln by pyrolysis can be used, and examples of the metal salts capable of producing an oxide of the metal M or the lanthanide metal Ln by pyrolysis include a carbonate, an oxalate, a citrate, a basic carbonate and a hydroxide of respective metals.

As for the starting material, a modification may be made therein, for example, a mixture obtained by adding a pre-synthesized α-sialon powder represented by the formula: $M_xSi_{12-(m+n)}Al_{(m+n)}O_nN_{16-n}$ or $M_xSi_{12-(m+n)}Al_{(m+n)}O_nN_{16-n}:Ln_y$ (wherein M is at least one metal selected from Li, Ca, Mg, Y and a lanthanide metal excluding La and Ce, Ln is at least one lanthanide metal selected from Eu, Dy, Er, Tb and Yb, 0.3≤x+y<1.5, 0<y<0.7, 0.3≤m<4.5, and 0<n<2.25) to a mixed powder at such a blending ratio that the product obtained by the firing above is represented by the same formula: $M_xSi_{12-(m+n)}Al_{(m+n)}O_nN_{16-n}$ or $M_xSi_{12-(m+n)}Al_{(m+n)}O_nN_{16-n}:Ln_y$, may be used as the starting material.

The method for mixing respective starting materials described above is not particularly limited, and a known method, for example, a method where the materials are dry mixed, or a method where the materials are wet mixed in an inert solvent substantially incapable of reacting with respective components of the raw material and then the solvent is removed, may be employed. A mixing device such as V-type mixer, rocking mixer, ball mill, vibration mill and medium stirring mill is suitably used. However, the nitrogen-containing silane compound and/or amorphous silicon nitride powder are highly sensitive to moisture and humidity and therefore, the mixing of starting materials must be performed in a controlled inert gas atmosphere.

The mixture of starting materials is fired at 1,400 to 2,000° C., preferably at 1,400 to 1,800° C. or 1,500 to 1,800° C., in a nitrogen-containing inert gas atmosphere under 1 atm, whereby the target α-sialon powder is obtained. If the firing temperature is less than 1,400° C., an impracticably long period of heating is required for the production of the desired α-sialon powder and also, the proportion of the α-sialon phase in the powder produced is reduced. If the firing temperature exceeds 2,000° C., the silicon nitride and sialon will be sublimated and decomposed to produce free silicon which is undesirable.

Furthermore, after mixing the α-sialon and an Li compound, the mixture may be re-heated at 1,000 to 1,400° C. in a nitrogen-containing inert gas atmosphere.

The mixed powder of starting materials may be also fired at a temperature of 1,600 to 2,000° C., preferably from 1,600 to 1,900° C., in a pressurized nitrogen gas atmosphere. In this case, the nitrogen gas pressurization suppresses sublimating decomposition of silicon nitride and sialon at high temperature, so that a desired α-sialon-based oxynitride phosphor can be obtained in a short time. The firing temperature can be raised by increasing the nitrogen gas pressure, and, for example, the mixed powder can be fired at 1,600 to 1,850° C.

under a nitrogen gas pressure of 5 atm and at 1,600 to 2,000° C. under a nitrogen gas pressure of 10 atm.

Furthermore, after mixing the α-sialon and an Li compound, the mixture may be re-heated at 1,000 to 1,400° C. in a nitrogen-containing inert gas atmosphere.

The heating furnace used for firing of the powder mixture is not particularly limited and, for example, a batch-type electric furnace in a high-frequency induction heating or resistance heating system, a rotary kiln, a fluidizing firing furnace, and a pusher-type electric furnace may be used.

The α-sialon-based oxynitride phosphor in a powder state produced by the production method of the present invention is composed of an α-sialon-based oxynitride represented by the formula above, and the emission intensity of fluorescence is improved as compared with conventional α-sialon-based oxynitride phosphors.

The median diameter in the particle size distribution curve of the α-sialon-based oxynitride phosphor is preferably 8 μm or less, more preferably from 1 to 6 μm.

The α-sialon-based oxynitride phosphor activated by a rare earth element of the present invention is kneaded with a transparent resin such as epoxy resin and acrylic resin by a known method to produce a coating agent, and a light-emitting diode whose surface is coated with the coating agent can be used as a light conversion element.

EXAMPLES

The present invention is described in greater detail below by referring to specific examples.

Examples 1 to 5

Silicon diimide with a specific surface area of 1,104 m$^2$/g obtained by reacting liquid ammonia with silicon tetrachloride in the form of a solvent-free solution or an inert organic solvent solution having a silicon tetrachloride concentration of 50 vol % or more was thermally decomposed at 600 to 1,200° C. to obtain an amorphous silicon nitride powder having an loose bulk density of 0.18 to 0.22 g/cm$^3$ and a specific surface area of 689 to 782 m$^2$/g. In this material, the metal impurity mixed in the amorphous silicon nitride powder is reduced to 10 ppm or less by a known method for improving the condition of chafing between the powder and the metal in the reaction vessel material and the powder handling machinery. Also, the oxygen concentration in the nitrogen gas flowing into the heating furnace can be controlled in a range of 20 to 1,000 ppm.

After confirming that the amorphous silicon nitride powder used as a starting material had a weight of predetermined value, an aluminum nitride powder, a lithium carbonate powder, a lithium nitride powder and a europium oxide powder were weighed in a nitrogen gas atmosphere to give the composition shown in Table 1. These powders were mixed by a vibration mill for 1 hour in a nitrogen atmosphere. After the mixing, the powder mixture was taken out and packed in a crucible in a nitrogen-purged glove box, and the crucible was set in a resistance heating furnace. The temperature was raised in a nitrogen atmosphere under atmospheric pressure according to a schedule of from room temperature to 1,200° C. over 2 hours, from 1,200 to 1,440° C. over 4 hours, and further from 1,440° C. to 1,725° C. over 2 hours, and held at that temperature for 12 hours to effect crystallization, whereby an α-sialon powder was obtained. Furthermore, the α-sialon and lithium oxide were mixed, and the mixture was heat-treated at 1,400° C. in a nitrogen atmosphere under atmospheric pressure.

The obtained powder was pulverized using an agate mortar, a dry pulverizer and a wet pulverizer. After pulverizing the powder to a predetermined particle diameter, the fluorescence characteristics were evaluated using FP-6500 with an integrating sphere manufactured by JASCO Corporation by setting the excitation wavelength to 450 nm.

The fluorescent characteristics measured were the dominant wavelength of fluorescence (a wavelength determined from an intersection of a straight line passing white point coordinates x=0.33 and y=0.33 in the CIE chromaticity diagram and two coordinate points of the emission spectrum of the sample, with a spectral locus) and the intensity of the dominant wavelength (the relative intensity is shown in Tables 1 and 2).

The loose bulk density of a powder in the present invention is determined by the method in accordance with JIS R9301-2-3. The specific surface area was measured by the BET method using nitrogen gas adsorption.

Comparative Examples 1 to 4

Silicon diimide with an loose bulk density of 0.08 g/cm$^2$ and a specific surface area of 869 m$^2$/g obtained by reacting liquid ammonia with a toluene solution having a silicon tetrachloride concentration of 33 vol % was thermally decomposed at 600 to 1,200° C. to obtain an amorphous silicon nitride powder having an loose bulk density of 0.09 g/cm$^2$ and a specific surface area of 463 m$^2$/g.

Subsequently, α-sialons were produced and evaluated in the same manner as in Example 1 except for employing the blending ratios shown in Comparative Examples 1 to 4 of Table 1.

Comparative Example 5

An α-sialon was produced and evaluated in the same manner as in Example 1 except for employing the blending ratio shown in Comparative Example 5 of Table 1.

TABLE 1

| | $M_xSi_{12-(m+n)}Al_{(m+n)}O_nN_{16-n}$: $Ln_y$ | | M = Li, Ln = Eu | | | | | | |
|---|---|---|---|---|---|---|---|---|---|
| | Silicon Diimide | | Amorphous Silicon Nitride | | | | | Fluorescence Characteristics | |
| | Loose Bulk Density | SSA | Loose Bulk Density | SSA | Composition | | | Dominant Wavelength | Fluorescence Intensity |
| NO | (g/cm$^3$) | (m$^2$/g) | (g/cm$^3$) | (m$^2$/g) | m | n | y | (nm) | (relative value) |
| Example 1 | 0.17 | 1104 | 0.22 | 689 | 1.00 | 0.30 | 0.10 | 582 | 143 |
| Example 2 | | | 0.18 | 782 | 1.00 | 0.30 | 0.10 | 584 | 159 |
| Example 3 | | | | | 0.80 | 2.40 | 0.04 | 580 | 125 |
| Example 4 | | | | | 3.00 | 1.50 | 0.05 | 578 | 99 |
| Example 5 | | | | | 4.00 | 2.00 | 0.20 | 578 | 90 |

TABLE 1-continued

| | $M_xSi_{12-(m+n)}Al_{(m+n)}O_nN_{16-n}$: $Ln_y$ Silicon Diimide | | $M$ = Li, $Ln$ = Eu Amorphous Silicon Nitride | | | | | Fluorescence Characteristics | |
|---|---|---|---|---|---|---|---|---|---|
| | Loose Bulk Density | SSA | Loose Bulk Density | SSA | Composition | | | Dominant Wavelength | Fluorescence Intensity |
| NO | (g/cm³) | (m²/g) | (g/cm³) | (m²/g) | m | n | y | (nm) | (relative value) |
| Comparative Example 1 | 0.08 | 869 | 0.09 | 463 | 1.00 | 0.30 | 0.10 | 582 | 120 |
| Comparative Example 2 | | | | | 0.80 | 2.40 | 0.04 | 578 | 105 |
| Comparative Example 3 | | | | | 3.00 | 1.50 | 0.05 | 577 | 79 |
| Comparative Example 4 | | | | | 4.00 | 2.00 | 0.20 | 577 | 70 |
| Comparative Example 5 | 0.17 | 1104 | 0.18 | 782 | 5.00 | 2.50 | 0.25 | 579 | 26 |

Examples 6 to 9

Silicon diimide with a specific surface area of 1,104 m²/g obtained by reacting liquid ammonia with silicon tetrachloride in the form of a solvent-free solution or an inert organic solvent solution having a silicon tetrachloride concentration of 50 vol % or more was thermally decomposed at 600 to 1,200° C. to obtain an amorphous silicon nitride powder having an loose bulk density of 0.18 to 0.22 g/cm³ and a specific surface area of 689 to 782 m²/g. In this material, the metal impurity mixed in the amorphous silicon nitride powder is reduced to 10 ppm or less by a known method for improving the condition of chafing between the powder and the metal in the reaction vessel material and the powder handling machinery. Also, the oxygen concentration in the nitrogen gas flowing into the heating furnace can be controlled in a range of 20 to 1,000 ppm.

After confirming that the amorphous silicon nitride powder used as a starting material had a weight of a predetermined value, an aluminum nitride powder, a calcium carbonate powder, a calcium nitride powder and a europium oxide powder were weighed in a nitrogen gas atmosphere resulting in the composition shown in Table 2. These powders were mixed by a vibration mill for 1 hour in a nitrogen atmosphere. After the mixing, the powder mixture was taken out and packed in a crucible in a nitrogen-purged glove box, and the crucible was set in a resistance heating furnace. The temperature was raised in a nitrogen atmosphere under atmospheric pressure according to a schedule of from room temperature to 1,200° C. over 2 hours, from 1,200 to 1,440° C. over 4 hours, and further from 1,440° C. to 1,725° C. over 2 hours, and held at that temperature for 12 hours to effect crystallization, whereby an α-sialon powder was obtained.

The obtained powder was pulverized using an agate mortar, a dry pulverizer and a wet pulverizer. After pulverizing the powder to a predetermined particle diameter, the fluorescence characteristics were measured using FP-6500 with an integrating sphere manufactured by JASCO Corporation.

Comparative Examples 6 to 9

Silicon diimide with an loose bulk density of 0.08 g/cm² and a specific surface area of 869 m²/g obtained by reacting liquid ammonia with a toluene solution having a silicon tetrachloride concentration of 33 vol % was thermally decomposed at 600 to 1,200° C. to obtain an amorphous silicon nitride powder having an loose bulk density of 0.09 g/cm² and a specific surface area of 463 m²/g.

Subsequently, α-sialons were produced and evaluated in the same manner as in Example 6 except for employing the blending ratios shown in Comparative Examples 6 to 8 of Table 1.

Comparative Examples 9 and 10

α-Sialons were produced and evaluated in the same manner as in Example 6 except for employing the blending ratios shown in Comparative Examples 9 and 10 of Table 2.

TABLE 2

| | $M_xSi_{12-(m+n)}Al_{(m+n)}O_nN_{16-n}$: $Ln_y$ Silicon Diimide | | $M$ = Ca, $Ln$ = Eu Amorphous Silicon Nitride | | | | | Fluorescence Characteristics | |
|---|---|---|---|---|---|---|---|---|---|
| | Loose Bulk Density | SSA | Loose Bulk Density | SSA | Composition | | | Dominant Wavelength | Fluorescence Intensity |
| NO | (g/cm³) | (m²/g) | (g/cm³) | (m²/g) | m | n | y | (nm) | (relative value) |
| Example 6 | 0.17 | 1104 | 0.22 | 689 | 2.80 | 0.30 | 0.10 | 586 | 152 |
| Example 7 | | | 0.18 | 782 | 2.80 | 0.30 | 0.10 | 585 | 162 |
| Example 8 | | | | | 1.00 | 0.30 | 0.06 | 582 | 139 |
| Example 9 | | | | | 3.70 | 0.30 | 0.15 | 589 | 140 |
| Comparative Example 6 | 0.08 | 869 | 0.09 | 463 | 2.80 | 0.30 | 0.10 | 586 | 127 |
| Comparative Example 7 | | | | | 1.00 | 0.30 | 0.06 | 582 | 119 |
| Comparative Example 8 | | | | | 3.70 | 0.30 | 0.15 | 588 | 119 |
| Comparative Example 9 | 0.17 | 1104 | 0.18 | 782 | 4.60 | 0.30 | 0.20 | 590 | 111 |

TABLE 2-continued

| | $M_xSi_{12-(m+n)}Al_{(m+n)}O_nN_{16-n}: Ln_y$ Silicon Diimide | | M = Ca, Ln = Eu Amorphous Silicon Nitride | | | | | Fluorescence Characteristics | |
|---|---|---|---|---|---|---|---|---|---|
| | Loose Bulk Density | SSA | Loose Bulk Density | SSA | Composition | | | Dominant Wavelength | Fluorescence Intensity |
| NO | (g/cm³) | (m²/g) | (g/cm³) | (m²/g) | m | n | y | (nm) | (relative value) |
| Comparative Example 10 | | | | | 1.00 | 3.00 | 0.015 | 573 | 38 |

The invention claimed is:

1. A method of producing an α-sialon-based oxynitride phosphor comprising:

forming a mixture powder comprising at least an amorphous silicon nitride powder having a loose bulk density of 0.1 to 0.3 g/cm³ and a specific surface area of from more than 600 m²/g to 800 m²/g, an aluminum source, an oxide of a metal M or a precursor substance capable of becoming an oxide of the metal M by pyrolysis, and an oxide of lanthanide metal Ln or a precursor substance capable of becoming an oxide of the lanthanide metal by pyrolysis, said mixture powder having a total composition which will produce a product represented by formula: $M_xSi_{12-(m+n)}Al_{(m+n)}O_nN_{16-n}: Ln_y$ (wherein M is at least one metal selected from the group consisting of Li, Ca, Mg, Y and a lanthanide metal excluding La and Ce; Ln is at least one lanthanide metal selected from the group consisting of Eu, Dy, E, Tb and Yb; 0.3≤x+y<1.5, 0<y<0.7, 0.3<m<4.5, and 0<n<2.25); and firing the mixed powder at 1,400 to 2,000° C. in a nitrogen-containing inert gas atmosphere.

2. The method as claimed in claim 1, wherein said mixed powder contains said amorphous silicon nitride powder, AlN and/or Al powder, an oxide of a metal M or a precursor substance capable of becoming an oxide of the metal by pyrolysis, and an oxide of a lanthanide metal Ln or a precursor substance capable of becoming an oxide of the lanthanide metal by pyrolysis.

3. The method as claimed in claim 1, wherein said mixed powder is a mixture obtained by adding a pre-synthesized α-sialon powder represented by formula: $M_xSi_{12-(m+n)}Al_{(m+n)}O_nN_{16-n}$ or the formula: $M_xSi_{12-(m+n)}Al_{(m+n)}O_nN_{16-n}:Ln_y$, AlN and/or Al powder, the oxide of the metal M or the precursor substance capable of becoming an oxide of the metal by pyrolysis, and the oxide of a lanthanide metal Ln or the precursor substance capable of becoming an oxide of the lanthanide metal by pyrolysis, wherein said mixture powder has a total compensation which will produce a product represented by the formula: $M_xSi_{12-(m+n)}Al_{(m+n)}O_nN_{16-n}: Ln_y$.

4. The method as claimed in claim 1, wherein the amorphous silicon nitride powder has a specific surface area of 650 to 800 m²/g.

5. The method as claimed in claim 1, wherein firing is performed at 1,400 to 1,800° C. in a nitrogen-containing inert gas atmosphere under 1 atm.

6. The method as claimed in claim 1, wherein said amorphous silicon nitride powder having a loose bulk density of 0.16 to 0.22 g/cm³ is produced by heat-treating a nitrogen-containing silane compound powder having a loose bulk density of 0.10 to 0.30 g/cm³.

7. The method as claimed in claim 6, wherein said nitrogen-containing silane compound powder having a loose bulk density of 0.10 to 0.30 g/cm³ is produced by mixing and reacting a halogenated silane compound with a liquid ammonia while supplying the halogenated silane compound by discharging it, as a solvent-free solution or an inert organic solvent solution having a halogenated silane compound concentration of 50 vol % or more, into the liquid ammonia.

* * * * *